No. 893,753. PATENTED JULY 21, 1908.
C. RODÉ & M. PICARD.
INSTRUMENT FOR MEASURING THE DISTANCE BETWEEN BEARINGS
OF MOVING PARTS.
APPLICATION FILED MAY 7, 1906.
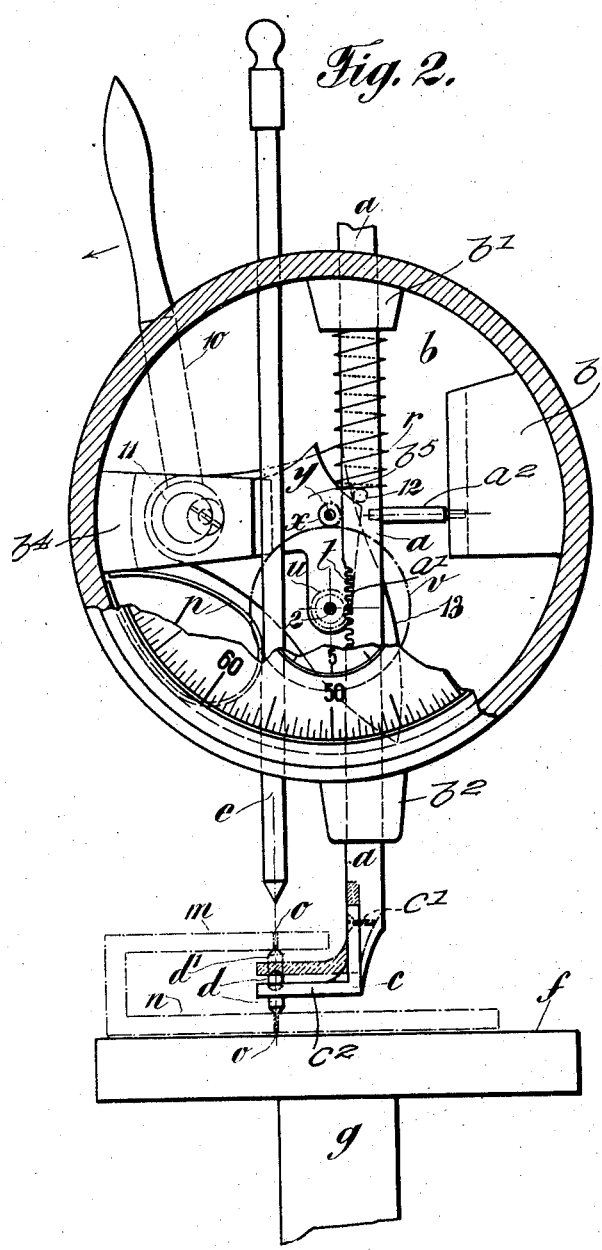
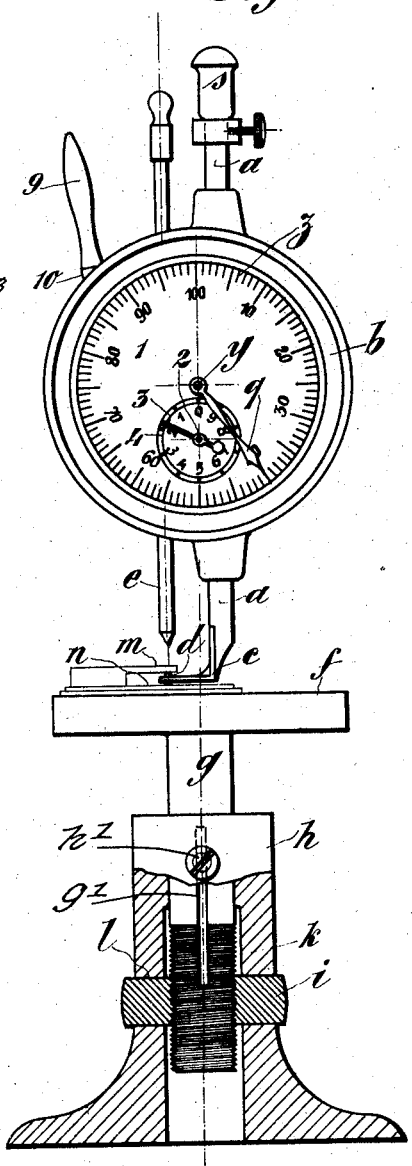
Witnesses:
Inventors:-
Charles Rodé
Maurice Picard
by B. Singer
Attorney

UNITED STATES PATENT OFFICE.

CHARLES RODÉ AND MAURICE PICARD, OF LA CHAUX-DE-FONDS, SWITZERLAND.

INSTRUMENT FOR MEASURING THE DISTANCE BETWEEN BEARINGS OF MOVING PARTS.

No. 893,753.      Specification of Letters Patent.      Patented July 21, 1908.

Application filed May 7, 1906. Serial No. 315,592.

*To all whom it may concern:*

Be it known that CHARLES RODÉ and MAURICE PICARD, manufacturers, citizens of Switzerland, residing at La Chaux-de-Fonds, Canton of Neuchâtel, Republic of Switzerland, have invented new and useful Improvements in Instruments for Measuring the Distance Between Bearings of Moving Parts, of which the following is a specification.

This invention relates to an improved measuring device for ascertaining the distance between bearings of clock or watch movements.

Heretofore it has been somewhat difficult to quickly and accurately determine the distance between superposed bearings such, for instance, as the bearing of a pillar plate and that of an overhanging bridge, this being increased by the fact that it is necessary to insert the measuring instrument between the bridge and pillar plate which, owing to the close proximity of the parts and the restricted operating space afforded, is somewhat difficult.

According to our invention there is provided an improved form of instrument which may readily be inserted between the bearings to be measured which will be more fully described in connection with the accompanying drawing and more particularly pointed out in the appended claims.

In the drawing:—Figure 1, is a front elevation, partly in section, of a measuring instrument embodying the main features of this invention. Fig. 2, is a front view on an enlarged scale showing parts in section and parts in elevation.

Like characters of reference designate similar parts throughout the different figures of the drawing.

As shown a base $h$ is provided having an adjusting nut $i$. A table is indicated at $f$ and is provided with a supporting stem $g$ which projects into the base $h$ and which is provided with threads $k$ whereby the table may be adjusted by means of the nut $i$ which engages said thread. A suitable arrangement such as the slot and pin $g'$ and $h'$ respectively may be provided to prevent the stem $g$ from rotating when it is raised and lowered by adjustment of the nut $i$.

A dial casing is designated at $b$ and is provided with a dial $z$ which is graduated at 1 for fractions of unit measurements and which is graduated at 4 for unit measurements. An index finger $q$ is mounted upon a shaft $y$ and is adapted to be rotated to indicate fractions of unit measurements. An index finger 3, is mounted on a shaft 2, and is adapted to indicate total or unit measurements. A centering member is provided in the form of a rod $e$ which is slidably mounted in the dial casing $b$ and vertically movable therein. A spring $p$ frictionally engages said rod $e$ and serves to hold the same in its adjusted position. A measuring member is provided in the form of a bar $a$ which is slidably mounted in bearings $b'$ and $b^2$ and projects through the casing $b$. A spring $r$ is interposed between the bearing $b'$ and a stud 12 on the bar $a$ and normally thrusts said bar into an extreme lower position. Said bar $a$ is provided with teeth $a'$ which mesh with and serve to drive a pinion $u$ mounted on the shaft 2 which also carries a gear wheel $v$ adapted to mesh with and drive a pinion $x$ on the shaft $y$. A stud carrying arm $c$ is removably secured to the bar $a$ by a screw $c'$ and said arm has an extension $c^2$ in which the measuring stud $d$ is secured. Said stud $d$ is provided with cone shaped ends the extremities of which are adapted to enter bearings $o$ in the parts $n$ and $m$.

In order to prevent the bar $a$ from rotating a pin $a^2$ is mounted in said bar and engages a groove in projection $b^3$ formed on the dial casing $b$. Means are provided for raising said bar $a$ and as shown said means consists of a lever 10 pivotally mounted at 11 to a bracket $b^4$ projecting inwardly from the casing $b$. Said lever carries a cam member 13 adapted to engage the pin 12 so that when said lever is swung in the direction of the arrow the bar $a$ will be raised. Conveniently the bracket $b^4$ is provided with an extension $b^5$ which forms a bearing for the shaft $y$ of the main index finger $q$ and for the shaft 2 of the auxiliary or units index finger 3.

The operation of taking a measurement is as follows:—The part $mn$ is placed upon the table $f$ and the centering rod $e$ is depressed to engage the bearing $o$ so that the latter will be in alinement with the stud $d$. The spring $p$ will serve to hold the rod $e$ in the position to which it has been adjusted. When the parts $mn$ have been so positioned they will occupy a position with respect to the stud $d$ as shown in Fig. 2, and the spring $r$ will act to hold the bar $a$ in its lowermost position so that the stud $d$ will engage the lower bearing o. The pointer q will then be in the position shown in Fig. 1. The nut i, located in the opening l, will then be turned to raise the table f until the pointer q reaches the zero position on the dial z. While the table is being raised the springs r and p will hold the bar and rod a and e respectively in engagement with the lower and upper bearings o. The parts are now in position to take the measurement and the lever 10 is moved in the direction of the arrow so as to raise the bar a until the stud d engages the upper bearing o. The extent of movement of the stud d will be indicated on the graduations 1, and when this is added to the known length of the stud d the distance between the bearings o will have been ascertained.

We claim:—

1. A measuring instrument comprising in combination, an adjustable table or support for the part to be measured, a dial casing provided with a dial and an index finger, a shaft for said index finger, a pinion mounted on said shaft, a gear wheel meshing with said pinion, a shaft for said gear wheel, a pinion mounted on said gear wheel shaft, a toothed bar meshing with said last mentioned pinion and slidably mounted in said dial casing, a spring normally holding said bar in a downward position, an arm removably secured to said bar and provided with an angular extension adapted to project between superposed bearings to be measured, a measuring stud for said extension having cone shaped end portions adapted to engage said superposed bearings, means for raising said bar to move the measuring stud from engagement with the lowermost into engagement with the uppermost bearing, a centering rod slidably mounted in said casing and in alinement with said stud, and frictionally acting means for holding said rod in its adjusted position.

2. A measuring instrument comprising in combination, a table or support for the part to be measured, means for adjusting said table, an indicating device provided with an index finger, a measuring bar operatively connected with said finger, an arm removably secured to said bar and provided with an angular extension adapted to project between superposed alined bearings, a measuring stud for said extension, means normally holding said bar in a lowermost position to engage the stud with the lowermost bearing, means for raising said bar to engage the stud with the uppermost bearing, and an adjustable centering rod for centering the bearings with respect to said stud.

3. A measuring instrument comprising in combination, a table or support for the part to be measured, means for adjusting said table, an indicating device, a measuring bar operatively connected with said indicating device whereby measurements may be indicated, an angular extension for said bar provided with a measuring stud adapted to be moved into engagement with superposed alined bearings, means for operating said bar, and means for centering the bearings to be measured with respect to said stud.

4. A measuring instrument comprising in combination, a table or support for the part to be measured, means for adjusting said table, an indicating device, a measuring bar operatively connected with said device, an angular extension for said bar provided with a measuring stud adapted to be moved into engagement with superposed alined bearings, and means for operating said bar.

In testimony whereof we have signed our names to this specification in the presence of two subscribing witnesses.

CHARLES RODÉ.
MAURICE PICARD.

Witnesses:
JEAN J. JAQUES,
CHARLOTTE L. PHILLIPS.